Dec. 21, 1948.    J. D. STRONG    2,456,899
USE OF SILICON COMPOUNDS IN PRODUCING
QUARTZ COATINGS IN A VACUUM
Filed Nov. 3, 1947

*INVENTOR.*
JOHN DONOVAN STRONG
BY Whittemore, Hulbert
& Belknap
ATTORNEYS

Patented Dec. 21, 1948

2,456,899

UNITED STATES PATENT OFFICE 2,456,899

USE OF SILICON COMPOUNDS IN PRODUCING QUARTZ COATINGS IN A VACUUM

John Donovan Strong, Baltimore, Md., assignor to Libbey-Owens-Ford Glass Company, Toledo, Ohio, a corporation of Ohio Application November 3, 1947, Serial No. 783,837

7 Claims. (Cl. 117—106)

The present invention relates to a method of coating with quartz or silica, chemically known as silicon dioxide by evaporation technique within a vacuum and refers more particularly to a method of coating with quartz by thermal evaporation of a composition including silicon monoxide so as to secure a rapid and easy evaporation of either the silicon dioxide and silicon monoxide or silicon monoxide which may be controlled to provide uniform thermal evaporation and to provide uniform and heavy coatings or coverings of quartz upon articles of manufacture, such for example as glass, plastic, reflectors, mirrors, articles coated for low reflection or other articles of manufacture.

The invention may be employed in the production of a quartz layer which functions in producing low reflection effects.

Quartz is highly transparent and because of this and its known characteristic of extreme hardness, it provides a particularly desirable and satisfactory permanent coating or covering for the surface of a mirror or reflector, especially a first surface mirror, or an article of low reflection, and such coating prevents any danger of scratching or otherwise marring such surface.

Attempts to thermally evaporate commercial quartz directly by the methods of thermal evaporation and to apply it by deposition to surfaces, such as reflective surfaces, have not been satisfactory for the reason that quartz is extremely difficult to heat and to evaporate. Quartz must be heated beyond 1500° C. to bring about vaporization and preferably the quartz must be heated to a range of 1800° C. to 2000° C. or more. It is known that quartz does not absorb heat by radiation and it does not melt during evaporation. As a solid it does not adhere to or wet a heating surface such as a thermal heating element or filament and the thermal contact with such surface or heating element or filament is very poor. Thus, getting heat into quartz becomes a problem and as its temperature must be raised very greatly to secure evaporation it has been found that quartz does not lend itself to evaporation by normal thermal evaporation technique. Where attempts have been made to thermally evaporate ordinary quartz within a vacuum and to deposit this upon a surface as a coating, the operations have been found to be very uncertain and at best only small quantities of the quartz could be evaporated. Further, the process of deposition was slow and unsatisfactory and uniform coatings were not obtained.

I have discovered that when the quartz to be evaporated is heated in a vacuum in the intimate presence of a solid silicon compound which reacts with silica when heated to form silicon monoxide that the thermal evaporation of the quartz is materially enhanced by the formation of silicon monoxide in that it becomes more uniform and more rapid, and moreover, that the coating of a surface, such as glass, plastic, or a reflective surface, by deposition thereupon of the evaporated quartz and silicon monoxide could be satisfactorily controlled to produce a uniform protective coating or a desired low reflection coating. Further, on exposing the deposit to air upon removing the coated article from the vacuum, the silicon monoxide present in the coating is largely transformed into silicon dioxide by oxidation of the deposit by reaction with the oxygen in the air. I have also found that I may evaporate silicon monoxide alone and thereafter by exposing the deposited coating to the atmosphere secure the desired coating of quartz by oxidation of the deposit.

It is therefore one of the objects of the invention to provide an improved method or process whereby the thermal evaporation of silicon oxides and their application by deposition on a surface can be employed in the forming of quartz coatings.

Another object of the invention is to provide an improved method or process whereby the evaporation of quartz can be controlled and speeded up to produce by deposition a uniform and relatively thick and extremely hard protective coating on a surface of an article such, for example, as glass or plastic or the reflective or mirrored surface of a piece of glass.

Another object of the invention is to provide an improved means or method whereby quartz may be preliminarily treated or mixed with a solid silicon compound of a reducing nature in a relatively simple and inexpensive manner to prepare the quartz for relatively rapid evaporation and dispersion when it is applied within a vacuum to a heat radiating support body such as an electrically heated evaporating element, for example, a tungsten or other filament or a crucible.

In accordance with one method of carrying out the invention, the quartz to be evaporated and deposited upon a surface is intimately mixed as pieces or powder with a solid reducing agent as pieces or powder comprising a silicon compound such as silicon or silicon carbide, by subjecting the quartz and silicon compound to a tumbling action. The solid silicon compounds are each of an oxidizable nature and when they are heated with quartz or silicon dioxide they act as reducing agents and react with it to form and provide silicon monoxide. The dusty coating upon the quartz pieces or the mixture with the quartz of the solid silicon compound reactable by heat with the silica to provide silicon monoxide may be fused with or sintered to the quartz by a preliminary heat treatment, preferably within a vacuum, which also serves to react the silica and the oxidizable solid silicon compounds either partially or completely to silicon monoxide. The intimately mixed materials thus prepared may then be applied to and supported by a heat radiating support body in a vacuum chamber. If desired, the fusion of the materials in the presence of each other may be carried out in the vacuum chamber with the materials on the heat radiating support body, just prior to the evaporation in the same chamber of the mixture of silicon oxides or silicon monoxide from the intimate mixture thus produced. Other methods of mixing the solid silicon reducing agent intimately with the quartz so as to provide silicon monoxide in contact with the quartz at the time of its evaporation may be used to give rapid and controlled evaporation of the quartz when the mixture is subsequently heated in a vacuum.

Since I have found silicon monoxide to be fairly volatile at temperatures somewhat below the evaporating temperature of quartz, I may proceed with advantage by applying silicon monoxide alone to a heat radiating support body in a vacuum chamber, evaporating this substance to form a coating on the selected surface of the article and thereafter exposing the coating to the atmosphere to oxidize the coating, thereby changing it to silicon dioxide or quartz. By the use of sufficient of the solid oxidizable silicon compound reducing agents of the nature above described to be chemically equivalent in quantity to the quartz in a given mixture, all of the silicon compounds may be evaporated in the high vacuum as silicon monoxide and the deposit secured may be subsequently oxidized to form a coating of silicon dioxide or quartz. The chemically equivalent quantities of the respective materials may be determined from the following respective chemical formulae and indicated reactions in which the symbols stand for the usual molecular quantities in parts per weight as calculated from the well known atomic weights of the various indicated elements.

$$Si + SiO_2 \rightarrow 2SiO$$

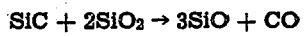

$$SiC + 2SiO_2 \rightarrow 3SiO + CO$$

Each of the solid silicon compounds, it will be noted, removes oxygen from the silicon dioxide to form silicon monoxide from the silicon dioxide and to form further silicon monoxide by the oxidation of the silicon content of the solid silicon compound. In other words, each of the silicon compounds is oxidized in reacting with the silica to give silicon monoxide and as such thus acts as a reducing agent. As silicon monoxide is readily oxidized by exposure to the atmosphere to silicon dioxide, it is preferable that the reactions forming silicon monoxide be carried out in a vacuum although this need not be the same vacuum in which is carried out my deposition or coating upon an article. While the rate of oxidation of the deposited coatings of, or including, silicon monoxide is fairly rapid when the coatings are exposed to the atmosphere, the silicon monoxide pieces or mixtures of solid silicon compounds and silica producing silicon monoxide may be readily handled and applied to heat radiating support bodies which may be thereafter heated in a vacuum chamber without the silicon monoxide having been completely altered by oxidation during exposure to the atmosphere during the loading operation.

As present knowledge of silicon monoxide is meager and it appears that it may only exist as a distinct chemical compound at higher temperatures, it will be understood that while I am employing a compound, silicon monoxide as such, at the higher temperatures at which this material or the silica is evaporated within the high vacuum, it is immaterial for my purposes whether silicon monoxide decomposes or not at room temperature into a mixture of silicon and silica as some investigators believe occurs.

The silicon monoxide or the quartz treated or mixed with a solid silicon reducing agent in the manner above described is according to the method of this invention placed in a suitable manner in a vacuum on a heat radiating support body such as an electrically heated coil or an electrically heated receptacle. In the present instance, the coil is a tungsten filament and the receptacle is a crucible. Such support body is then heated to heat the applied material.

When evaporating silicon monoxide, the material may become molten and a superficial molten condition generally appears on the surface of the intimate mixture containing quartz which permits the securing of good heat conduction by the quartz with the heat radiating support body such as the filament or receptacle. The heated silicon monoxide or mixture of silica and solid silicon reducing agent when heated, in contrast to ordinary quartz alone, readily absorbs radiant heat and both this condition and good thermal conduction secured by the fusion permit the rapid influx of heat into the materials and the raising of their temperature to a point where evaporation can be secured. The temperature of the heat radiating support body is maintained at a high degree and the heat penetrates the entire body of the treated quartz and/or of the silicon monoxide so that evaporation proceeds positively and regularly, thus permitting by reason of uniform thermal evaporation from all surfaces of the quartz and silicon monoxide the securing of uniform and controlled surface coatings by the deposition of the evaporated quartz and/or silicon monoxide upon the support surface of the article of manufacture such, for example, as a mirror.

In general then, the process or method comprises positioning silicon monoxide alone or positioning quartz and a solid silicon reducing agent which by reaction with the silica converts all of the silica or a part of the silica into silicon monoxide when the mixture is heated, upon and supported by a heat radiating support body such as an electrically heated filament or receptacle within a high vacuum and heating the applied material or materials to a high temperature by heat radiation and conduction from such support body and continuing the heat to evaporate the silicon monoxide or silicon monoxide and silicon dioxide and depositing such upon a surface of an article, and thereafter removing the coated article carrying the deposit from the vacuum chamber and oxidizing the deposit to form a quartz coating.

The foregoing and other objects of the invention will appear from the following description and appended claims when considered in connection with the accompanying drawings forming part of this specification wherein like reference characters designate corresponding parts in the several views.

Before explaining in detail the present invention, it is to be understood that the invention is not limited in its application to the details of construction and arrangement of parts illustrated in the accompanying drawings since the invention is capable of other embodiments and of being practiced or carried out in various ways. It is to be understood also that the phraseology or terminology employed herein is for the purpose of description and not limitation and it is not intended to limit the invention herein claimed beyond the requirements of the prior art.

Figure 1:
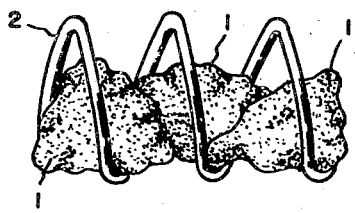
Figure 1 is an elevational view of a portion of an electric coil or filament shown supporting several irregular pieces of silicon monoxide, to which heat is supplied by the filament when heated to thereby evaporate the silicon monoxide, the electric coil or filament forming part of the apparatus for carrying out the method embodying the invention.

Referring now particularly to Figure 1 of the drawings, there are shown pieces of silicon monoxide 1 of irregular contour or formation supported by a heat radiating support body formed of an electrically heatable coil or filament 2 which, for example, may be of tungsten or tantalum.

Figure 2:
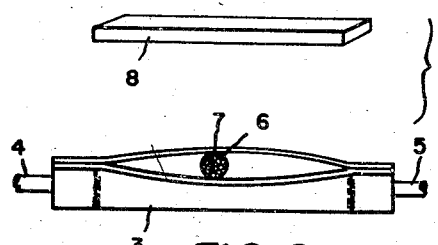
Figure 2 is a perspective view of an electrically heatable receptacle forming a modified part of the apparatus for carrying out the method in accordance with the present invention, the receptacle as shown containing pieces or particles in intimate contact of quartz and silicon.

Figure 2 shows the heat radiating support body formed of a receptacle 3 and more particularly a crucible or boat which is preferably heated by current passing through suitable leads 4 and 5 attached to the opposite ends. The receptacle is made of suitable material, for example, tantalum, tungsten or graphite. An intimate mixture in pellet form of quartz 6 and silicon 7 may be placed therein and evaporated within a vacuum when heat is applied. All surfaces or portions of the quartz and silicon forming the intimate mixture are subjected to the heat, the quartz becoming heated throughout by radiation absorption, and by virtue of this, evaporation can be secured from all quartz surfaces and silicon monoxide surfaces and uniformly in a generally upward direction to contact the surface to be coated of the article 8 which is located above the support body. Thus both the heating and the evaporation of the quartz and/or silicon monoxide are controlled and effectually accomplished and when the heat radiating support body is a filament as illustrated in Figure 1, evaporation uniformly in all directions may be secured.

Figure 3:
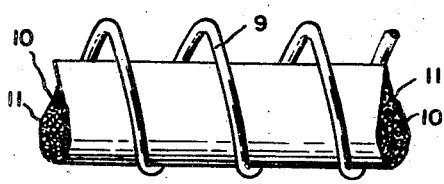
Figure 3 is a view similar to Figure 1 in which the electric coil or filament is shown as containing an intimate mixture of pieces or particles of quartz and pieces of another material comprising a solid silicon compound reducing agent, such as silicon carbide or silicon.

In Figure 3, there is shown a heat radiating support body in the nature of a filament 9 upon which has been positioned an intimate mixture of silica 10 and of a solid silicon reducing agent 11, such for example as silicon or silicon carbide. Such a mixture may be in the form of a pellet or rod, the latter being shown. The mixture may be heated on the filament in a high vacuum in the same manner as just described above to form a thermally evaporated deposit upon the surface to be coated of an article and the deposit thereafter converted to a quartz coating by subsequent oxidation. The proportions of silica and silicon or silicon compound may be such that each at the time of evaporation will be either completely reacted to silicon monoxide or to some silicon monoxide and chemically unaltered silica which latter is in excess.

The maintenance of a high degree of temperature within high vacuum on the heat radiating support body such as the receptacle 3 or the coil or filament 9 will cause in each instance the solid silicon reducing agent to first react with the quartz or silica to form silicon monoxide. The heat will then cause the evaporation of the silicon monoxide or silicon monoxide and quartz or silica where all or not all respectively of quartz or silica in each mixture applied to the heat radiating support body is converted to silicon monoxide by chemical reaction. The molecules of silicon monoxide or silicon oxides will be dispersed and deposited upon the surface of the article, such as the reflective face of a mirror or reflector located within the vacuum apparatus, to produce on the surface a layer of silicon monoxide or quartz and silicon monoxide which is uniform and may be relatively thick. In the same manner, the maintenance of a high degree of temperature within high vacuum on the coil or filament 2 will cause evaporation of the silicon monoxide to produce a uniform layer of silicon monoxide on the surface of the article.

Figure 5:
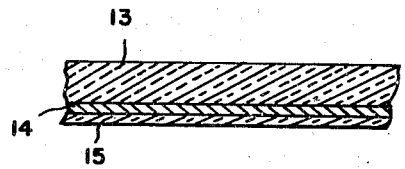
Figure 5 is a sectional view of a mirror or reflector having a surface protective coating or layer of quartz produced in accordance with the present method or process.

In Figure 5 there is shown a finished product or article produced in accordance with the invention. In this figure the article 12, for example a mirror or reflector, has the base 13 preferably formed from glass, the reflective or mirror surface 14 and the relatively thick and uniform protective surface coating or layer 15 of quartz. It is to be noted particularly that the quartz protective coating or layer is relatively thick and uniform so as to provide a permanent protective coating or surface for the mirror or reflector to prevent any danger of damaging or marring the mirror or reflective surface by scratching or otherwise.

Figure 4:
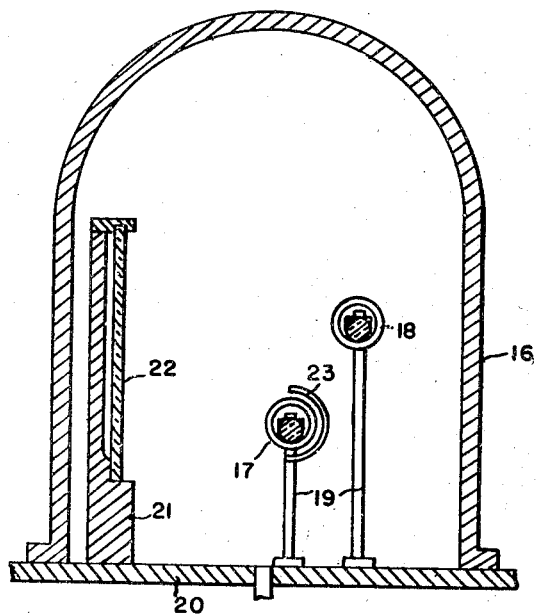
Figure 4 is a vertical sectional view of a suitable apparatus for performing the technique of evaporation of silicon monoxide or of quartz in the presence of a solid silicon reducing agent in accordance with the invention and for effecting the deposition upon the support surface of an article of the silicon monoxide or silicon oxides.

Referring now particularly to Figure 4 of the drawings there is shown suitable apparatus for effecting thermal evaporation of the silicon monoxide or of the mixtures described which react before evaporation to form some silicon monoxide. The apparatus as shown comprises the bell jar 16 attached to a vacuum pump (not shown) and containing tungsten electric coils 17 and 18 supported by upright supports 19 carried by the base 20. Located within the bell jar is the article support 21 carrying the article 22 upon which a coating of quartz is to be formed and upon which other coatings such as mirror coatings may also be applied.

Example 1

By way of illustrating the application of the invention in the forming of a mirror protected by a quartz surface layer in an apparatus such as that illustrated in Figure 4, 0.75 gram of silver and pieces of silicon monoxide weighing 0.24 gram were placed in the filaments 17 and 18 respectively. Upon the article support 21 there was placed a piece of clean glass 22 to the side of these filaments at a distance of 12 inches. A hemispherical screen 23 was placed behind the filament 17 carrying the silver. The chamber was then closed and evacuated to produce a high vacuum such as approximately 10 to the minus 5 mm. The filament 17 was then energized and the silver evaporated and deposited upon the glass to form a mirror deposit thereon, the screen 23 shielding the filament 18 and the silicon monoxide upon the latter filament. The filament 18 was then heated and the silicon monoxide evaporated upon the silver coated glass. The vacuum was then released and the coated article removed to the atmosphere and the deposit oxidized to a quartz coating, thus giving a silver first surface mirror in which the silver coating and protective quartz coating thereon were of about equal thicknesses of the order of .0001 mm. This mirror might also be used as a second surface mirror when viewed through the glass.

Example 2

10% of silicon carbide was mixed with silicon dioxide and the mixture preheated in a vacuum oven to form an intimate pelleted mixture. The pellets were then applied to a tungsten filament in an apparatus similar to that shown in Figure 4 in which a sheet of glass was placed upon the article support. Upon heating the electric coil the pellets were seen to partially fuse and a rapid evaporation of the silicon oxides occurred. The deposit upon the glass was observed by reflection and when the same took on a desired shade the coating operation was stopped so as to secure a thickness approximating a one-quarter wave length in light. After removing the coated glass from the chamber the film oxidized to a coating of quartz and showed a reduced reflection as compared to the original uncoated glass thus providing a low reflection article.

Example 3

A mixture of 28 parts of silicon and 60 parts of silica which respectively provides the two materials in chemically equivalent quantities, was loaded into a tantalum receptacle, illustrated in Figure 2 and the latter placed in a vacuum chamber similar to that of Figure 4. After a high vacuum was created and the tantalum receptacle was heated by passage of current therethrough, the mixture was seen to partially fuse and a rapid evaporation of silicon monoxide occurred. As the materials were used in equivalent quantities all of the composition was converted into silicon monoxide and directly distilled. The evaporated material was deposited upon a glass plate located above the receptacle and when the coated glass plate was removed from the vacuum chamber the deposit of silicon monoxide became oxidized to silicon dioxide. The evaporation was easy to carry out in contrast to attempting to distill the quartz directly and the coating thus produced was hard.

Example 4

In a manner similar to that shown in Example 3, there was placed in a boat a mixture of 5% silicon with silica and the boat was set up within a vacuum chamber. Upon applying a high heat to the boat an incipient fusion was seen to occur and rapid evaporation proceeded.

In such a mix some silicon monoxide was formed by reaction between the hot silicon and hot silica but a very considerable excess of silica was present. The evaporation occurred readily and easily whereas quartz alone heated in a similar boat would not evaporate rapidly even when the boat was heated to such high temperatures that the boat fused. The boat in this case was formed of tantalum.

Example 5

A mixture of 10% silicon carbide and silica was divided into two parts and one part was preheated to a high temperature in a vacuum oven to cause reaction between the two compounds and to form some silicon monoxide mixed with the excess silica as a fused pellet. The pellet was then applied to a tungsten filament in a vacuum chamber. The other part was applied to a second tungsten filament. Both filaments and a glass plate coated with an aluminum mirror film were placed within a vacuum chamber with the aluminum mirror film facing the filaments. Upon heating in the vacuum created within the chamber the filament carrying the prefused and pre-reacted mixture of silica and silicon carbide which then contained silicon monoxide there occurred a ready evaporation of the mixture. Upon heating in the vacuum the other filament carrying the non-reacted silica and silicon carbide, reaction readily occurred and a slight fusion was noted and rapid evaporation equal to that observed with the prefused and pre-reacted mixture occurred. Upon the aluminum mirror surface a deposit was formed which when the coated article was taken from the vacuum chamber produced a hard transparent coating of quartz by the oxidation in the air.

It is obvious that by the new methods of producing quartz coatings thus above described there can be readily formed quartz coatings in any desired thickness upon a support surface of glass, plastic or other material to produce a desired article of manufacture. For example, low reflection articles involving a quartz deposit may thus be produced as well as mirrors having a deposit of quartz forming a protective layer.

What I claim as my invention is:

1. The method of coating a surface with quartz by evaporation technique within a vacuum comprising evaporating on a heat radiating support body in a high vacuum a composition including silicon monoxide, depositing the composition on a support surface and subsequently oxidizing the deposit to form a quartz coating.

2. The method of coating a surface with silicon dioxide by evaporation technique within a vacuum comprising heating a mixture including silicon dioxide and a solid reducing agent selected from the group consisting of silicon and silicon carbide on a heat radiating support body in a high vacuum to a high temperature, reacting the mixture to a composition including silicon monoxide, evaporating the composition, depositing the same on a support surface, and subsequently changing any silicon monoxide in the deposit to secure a coating of silicon dioxide.

3. The method of coating a surface with quartz by evaporation technique within a vacuum, comprising heating silicon monoxide on a heat radiating support body in a high vacuum to a high temperature to evaporate the silicon monoxide, depositing the silicon monoxide on a support surface, and oxidizing the deposit to form a quartz coating.

4. The method of coating a surface with quartz by evaporation technique within a vacuum, comprising heating quartz in contact with a material selected from the group consisting of silicon and silicon carbide reactive with the quartz to form silicon monoxide when heated on a heat radiating support body in a high vacuum to react the quartz to form silicon monoxide, continuing the application of heat to evaporate the silicon monoxide, depositing the silicon monoxide on a support surface, and oxidizing the deposit to form a quartz coating.

5. The method of coating a surface with quartz by evaporation technique within a vacuum, comprising heating quartz in intimate contact with silicon monoxide on a heat radiating support body in a high vacuum to a high temperature to evaporate the quartz and silicon monoxide, depositing the quartz and silicon monoxide on a support surface, and oxidizing the deposit.

6. The method of coating a surface with silicon dioxide by evaporation technique within a vacuum comprising heating a mixture including silicon dioxide and silicon on a heat radiating support body in a high vacuum to a high temperature, reacting the mixture to a composition including silicon monoxide, evaporating the composition, depositing the same on a support surface, and subsequently changing any silicon monoxide in the deposit to secure a coating of silicon dioxide.

7. The method of coating a surface with silicon dioxide by evaporation technique within a vacuum comprising heating a mixture including silicon dioxide and silicon carbide on a heat radiating support body in a high vacuum to a high temperature, reacting the mixture to a composition including silicon monoxide, evaporating the composition, depositing the same on a support surface, and subsequently changing any silicon monoxide in the deposit to secure a coating of silicon dioxide.

JOHN DONOVAN STRONG.

REFERENCES CITED

The following references are of record in the file of this patent:

UNITED STATES PATENTS

| Number | Name | Date |
|---|---|---|
| 2,386,876 | Ogle | Oct. 16, 1945 |